United States Patent Office 3,185,716
Patented May 25, 1965

---

3,185,716
PROCESS OF CHROMATOGRAPHIC EXTRACTION OF VITAMIN $D_2$ AND/OR PRE-VITAMIN $D_2$
Francis Balestic, Versailles, France, assignor to Commissariat à l'Energie Atomique
No Drawing. Filed Mar. 18, 1963, Ser. No. 266,046
Claims priority, application France, Mar. 29, 1962, 892,625
6 Claims. (Cl. 260—397.25)

The present invention relates to a process of extraction, by chromatography on an activated fluoridine, of vitamin $D_2$ and/or pre-vitamin $D_2$.

Vitamin $D_2$ is generally prepared by the ultraviolet irradiation of ergosterol in solution in an organic solvent, which must not contain any trace of oxygen or peroxide. The solvent used is usually benzene, ethyl ether, ethyl alcohol, pentane, hexane or cyclohexane.

The source of ultraviolet rays is generally constituted by a magnesium arc, operating at a voltage of about 10,000 v., or a mercury vapour lamp. Preferably, the radiation is filtered in order to improve the yield of vitamin $D_2$ by utilising only radiation having wavelengths of 275–300 microns.

Only pre-vitamin $D_2$ (pre-calciferol) is formed, if the temperature is lower than 20° C. Between 20° and 80° C., a mixture of calciferol and pre-calciferol is obtained, the proportion of calciferol increasing with temperature. Around 75° C., calciferol principally forms. The risk of decomposition in practice prohibits operation at a temperature of more than 80° C.

The vitamin and/or pre-vitamin $D_2$ thus obtained can be separated from the irradiated mixture by various methods, such as the following:

(1) The ergosterol is precipitated in the first place with digitonin. Then, tachysterol and lumisterol, namely other irradiation products, are eliminated with citraconic anhydride, which transforms them into insoluble addition products and calciferol is isolated by fractional crystallisation from acetone.

(2) The mixture of irradiation products is esterified with 3.5-dinitrobenzoyl chloride in a mixture of benzene and pyridine. The various dinitrobenzoates of the irradiation products are then separated by chromatographic absorption in a column of neutral alumina and then re-crystallised from suitable organic solvents (petroleum, ether, methyl ethyl ketone, benzene).

The vitamin and/or pre-vitamin $D_2$ can also be formed by the irradiation of ergosterol by means of ionising radiations, and then extracted by methods which are identical or analogous to those set out above for irradiation with ultraviolet rays.

In a general manner, the method of extraction by chromatographic adsorption can utilise, for example, absorbent substances constituted by or based on magnesia (celite magnesia, for example) activated bentonite (super-filtroc), activated neutral alumina, fluoridine, etc. Such a method, already used for the separation of ultraviolet radiation products containing vitamin $D_2$, can be used for the case of ionisation radiation. Also, it is applicable to the separation of vitamins A and B contained in fish liver oils.

The present invention has the object of providing a process of extraction, by chromatography on an activated fluoridine, of vitamin $D_2$ and/or pre-vitamin $D_2$ obtained by irradiation.

According to the invention, there is provided a process of chromatographic extraction of vitamin $D_2$ and/or pre-vitamin $D_2$ prepared by the ultraviolet irradiation of ergosterol, which comprises forming a solution of the irradiation products associated with the vitamin $D_2$ and/or pre-vitamin $D_2$ and unconverted products in non polar or weakly polar organic solvent, effecting chromatographic adsorption of the solution by passage through an activated fluoridine and eluting the said vitamins with an organic solvent which is not less polar than the first-mentioned solvent.

A preferred method for carrying out the activation of the fluoridine consists in eliminating a large part at least of the iron which it contains, heating for a substantial time period below 100° C., adjustment of the particle size range at from 100 to 500 microns and at least one scrubbing by an organic solvent.

The treatment for activation of the fluoridine described above enhances its adsorption capacity and resolution power and favours the decomposition of undesirable irradiation products on its surface.

Preferably, the treatment of the fluoridine is carried out so that the activated fluoridine utilised for the adsorption is constituted by particles which have dimensions from 275 to 325 microns. An example of the process of chromatographic extraction of vitamin $D_2$ and/or pre-vitamin $D_2$ according to the invention is given below.

The means for carrying out the example should be considered as forming part of the invention, it being understood that equivalent means can also be used.

EXTRACTION OF VITAMIN $D_2$ AND/OR PRE-VITAMIN $D_2$

*(a) Preparation of activated fluoridine and setting up of the adsorption column*

A fluoridine was used of the type known under the trademark "Florex XXS 60/100." This trademark is used with a Florida fuller's earth that has been subjected to an extrusion process to increase its adsorptive capacity by 20 to 30% over the untreated material. It is a greyish-white powder with an apparent density of 31–35 lb./cu. ft. and a sp. gr. of 2.2–2.4 and is available in different mesh sizes. This was heated for three hours in the presence of concentrated hydrochloric acid in order to eliminate the largest part of the iron which it contains. It was then subjected to prolonged washing with distilled water, in order to eliminate hydrochloric acid. The fluoridine powder was then heated at 40° C. for 48 hours and then passed successively through two screens having meshes which were respectively 500 microns and 100 microns. The powder was then introduced into a chromatography column (length 20 cm., inner diameter 1.4 cm.) and washed with 80 cc. of 95% ethanol. The washing not only maintains an elevated adsorption capacity, but also causes decomposition in the column of tachysterol. A second washing of the fluoridine with 88 cc. of cyclohexane renders the column capable, under the best possible conditions, of being utilised for adsorption chromatography.

*(b) Preparation of an organic solution of irradiated ergosterol*

Irradiated ergosterol, for example, by means of cobalt 60, was dissolved directly in cyclohexane. 100 cc. of cyclohexane per 20 mg. ergosterol are used.

*(c) Passage of the solution of (b) through the adsorption column*

The nontransformed ergosterol and the irradiation products were quantitatively fixed on the column.

*(d) Elution*

Carbon tetrachloride is used, the velocity of flow being lower than 2 cc. per minute. Vitamin $D_2$ and/or pre-vitamin $D_2$ were recovered quantitatively and in the pure state in the first 250 cc. of carbon tetrachloride. The total operation of the chromatography operations (c) and (d) was about 3 hours.

Other solvents can be used for elution. Mention may be made, for example, of benzene (but this gives a risk of overlapping of the elution peaks for ergosterol, on the one hand, and for vitamin $D_2$ and/or pre-vitamin $D_2$, on the other hand), and cyclohexane (necessity of using a larger volume of eluant than in the case of carbon tetrachloride; cyclohexane has the advantage, however, of giving a very fine separation of ergosterol and vitamin $D_2$).

The solvent used for dissolving the irradiated ergosterol can also be carbon disulphide or normal hexane, instead of cyclohexane.

The method of the invention has the advantage, over the method used previously, of being much easier to use and of giving an appreciable gain in time, taking into account that fractional precipitations from various solvents, elimination of the solvent and subsequent chemical treatments are no longer necessary.

On the other hand, the process of the invention has the advantage of giving the possibility of a very fine separation of vitamin $D_2$ (and/or pre-vitamin $D_2$) and irradiated ergosterol.

I claim:

1. A process of chromatographic extraction of vitamin $D_2$ and pre-vitamin $D_2$ prepared by the ultraviolet irradiation of ergosterol, which comprises forming a solution of the irradiation products associated with the vitamin $D_2$ and pre-vitamin $D_2$ and unconverted products in non-polar or weakly polar organic solvent, effecting chromatographic adsorption of the solution by passage through Florida fuller's earth and eluting the said vitamins with an organic solvent which is not less polar than the first-mentioned solvent.

2. A process according to claim 1, in which the irradiation products associated with the vitamins $D_2$ and pre-vitamins $D_2$ and unconverted products remain on the Florida fuller's earth.

3. A process according to claim 1, in which use is made of a Florida fuller's earth activated by elimination of a major part of the iron contained therein, prolonged heating at a temperature of not more than 100° C. and washing with an organic solvent.

4. A process according to claim 1, in which the Florida fuller's earth has a particle size range of 275 to 325 microns.

5. A process according to claim 1, in which the first-mentioned solvent is cyclohexane.

6. A process according to claim 1, in which the elution solvent is selected from the group consisting of carbon tetrachloride and cyclohexane.

References Cited by the Examiner

UNITED STATES PATENTS 2,895,971    7/59   Spiegel et al. _____ 260–397.25

LEWIS GOTTS, *Primary Examiner*.